US008589264B2

(12) United States Patent
Clemm et al.

(10) Patent No.: US 8,589,264 B2
(45) Date of Patent: Nov. 19, 2013

(54) TOKEN LICENSING MAPPING COSTS TO ENABLED SOFTWARE TOOL FEATURES

(75) Inventors: Geoffrey M. Clemm, Lexington, MA (US); Catherine G. Col, Lexington, MA (US); William Goddin, Lexington, MA (US); Carl P. Zetie, Waterford, VA (US)

(73) Assignee: International Business Machines Corporation, Armonk, NY (US)

( * ) Notice: Subject to any disclaimer, the term of this patent is extended or adjusted under 35 U.S.C. 154(b) by 1042 days.

(21) Appl. No.: 12/581,305

(22) Filed: Oct. 19, 2009

(65) Prior Publication Data
US 2011/0093371 A1    Apr. 21, 2011

(51) Int. Cl.
G06F 21/00 (2013.01)
G07F 19/00 (2006.01)
G06F 21/10 (2013.01)
G06Q 30/06 (2012.01)

(52) U.S. Cl.
CPC ......... *G06F 21/10* (2013.01); *G06Q 30/06* (2013.01); *Y10S 707/99933* (2013.01); *Y10S 707/99939* (2013.01); *Y10S 707/99948* (2013.01)
USPC ......... 705/34; 705/30; 705/59; 707/999.003; 707/999.009; 707/999.107

(58) Field of Classification Search
CPC ............................. G06F 21/10; G06Q 30/06
USPC .......... 705/59, 52, 37, 26.1; 725/131; 726/28, 726/1, 3, 6; 707/999.107, 999.003, 999.009
See application file for complete search history.

(56) References Cited

U.S. PATENT DOCUMENTS

| 5,109,413 | A  | * | 4/1992  | Comerford et al. ......... 705/54 |
| 5,375,206 | A  |   | 12/1994 | Hunter et al. |
| 5,596,576 | A  | * | 1/1997  | Milito ......................... 370/450 |
| 5,649,185 | A  | * | 7/1997  | Antognini et al. ............ 726/2 |
| 7,177,908 | B1 | * | 2/2007  | Chang et al. ................ 709/206 |
| 2001/0000541 | A1 |   | 4/2001 | Schreiber et al. |
| 2003/0069828 | A1 | * | 4/2003 | Blazey et al. ................. 705/37 |
| 2004/0181416 | A1 | * | 9/2004 | Lee et al. ...................... 705/1 |
| 2004/0255143 | A1 | * | 12/2004 | Wemyss et al. ............. 713/200 |
| 2004/0267552 | A1 |   | 12/2004 | Gilliam et al. |

(Continued)

OTHER PUBLICATIONS

"An on-demand licensing model for distributed environment products," [online] ip.com, No. IPCOM000132675D; Jan. 2, 2006.

(Continued)

*Primary Examiner* — Matthew Gart
*Assistant Examiner* — Olusegun Goyea
(74) *Attorney, Agent, or Firm* — Patents on Demand P.A.; Brian K. Buchheit; Scott M. Garrett

(57) ABSTRACT

A request to activate a software tool can be received, where activation requires a quantity of tokens of a token license model. An entity, project, user-set, user, or combination thereof corresponding to the request can be ascertained. A feature-set to be enabled can be determined by querying preexisting indexed records. The preexisting indexed records can associate different feature-sets to different entities, projects, user-sets, users, or combinations thereof. A token cost can be computed for activating the software tool with the feature-set enabled for the request. Token costs for utilizing the software tool can vary depending upon the enabled feature-set. The computed token cost can be the quantity of tokens required to activate the software tool responsive to the request.

20 Claims, 6 Drawing Sheets

(56) References Cited

U.S. PATENT DOCUMENTS

| | | | |
|---|---|---|---|
| 2006/0168322 A1* | 7/2006 | Gray et al. | 709/238 |
| 2006/0179058 A1 | 8/2006 | Bram et al. | |
| 2006/0294019 A1* | 12/2006 | Dayan et al. | 705/59 |
| 2007/0028068 A1* | 2/2007 | Golding et al. | 711/170 |
| 2007/0198421 A1* | 8/2007 | Muller et al. | 705/52 |
| 2007/0198422 A1* | 8/2007 | Prahlad et al. | 705/52 |
| 2007/0203846 A1* | 8/2007 | Kavuri et al. | 705/59 |
| 2007/0226150 A1* | 9/2007 | Pietrzak et al. | 705/59 |
| 2007/0256124 A1* | 11/2007 | Ih et al. | 726/9 |
| 2008/0127053 A1* | 5/2008 | Stubbs et al. | 717/106 |
| 2008/0150761 A1* | 6/2008 | Hines et al. | 340/936 |
| 2008/0155100 A1* | 6/2008 | Ahmed et al. | 709/226 |
| 2009/0037337 A1 | 2/2009 | Baitalmal et al. | |
| 2009/0171726 A1* | 7/2009 | Johnson et al. | 705/7 |
| 2009/0177740 A1 | 7/2009 | Curren | |
| 2009/0249440 A1* | 10/2009 | Platt et al. | 726/1 |
| 2010/0010915 A1* | 1/2010 | Shea et al. | 705/26 |
| 2010/0017840 A1* | 1/2010 | Akins et al. | 725/131 |
| 2010/0131560 A1* | 5/2010 | Malik | 707/785 |
| 2010/0250438 A1* | 9/2010 | Hamnen et al. | 705/52 |

OTHER PUBLICATIONS

"Vibrant and ATA launch VibraSuite for mechanical test and analysis," Noise & Vibration Worldwide, vol. 37, No. 2, p. 6-7, Feb. 2006.

* cited by examiner

Scenario 120

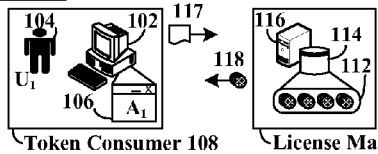

Tool A, Feature Set 1
Tool Cost = 10 Tokens

Scenario 130

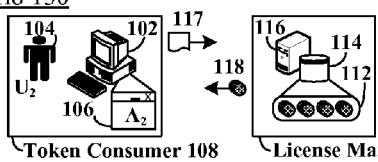

Tool A, Feature Set 2
Tool Cost = 12 Tokens

Scenario 140

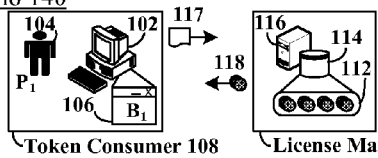

Project 1 = Tool B, Feature Set 1
Tool Cost = 20 Tokens

Scenario 150

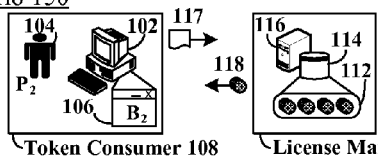

Project 2 = Tool B, Feature Set 2
Tool Cost = 16 Tokens

Scenario 160

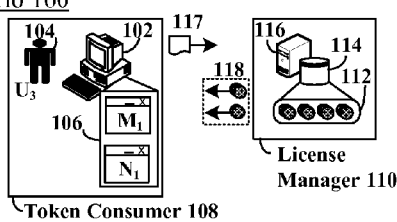

Tool Cost = 10 Tokens = 4 + 3 + 3
$\overline{M_1} = \overline{R_A} + \overline{R_B} + \overline{R_C}$ Tool Cost = 10 Tokens = 3 + 2 + 5
$\overline{N_1} = \overline{R_B} + \overline{R_D} + \overline{R_E}$ Tool Cost = 18 Tokens = 4 + 3 + 3 + 2 + 5
$\overline{M_1} + \overline{N_1} = \overline{R_A} + \overline{R_B} + \overline{R_C} + \overline{R_D} + \overline{R_E}$

FIG. 1

Data structures: 610                                                           600

CURRENT-DATE integer 612
       DEFAULT-TIMEOUT integer 614
       TOKENS-AVAILABLE integer 616
       OPERATION-TO-TOOL-MAP index 618
       PROJECT-TO-PROPERTY-LIST-MAP index 620
       USER-TO-TOOL-MAP index 622
       TOOL-TO-TOKEN-USE-ALGORITHM-MAP index 624
       TOOL-TO-COMPOSITE-TOOL-MAP index 626

1. The tool, "E", that owns operation "B" is looked up in the OPERATION-TOOL-MAP
2. The USER-TO-TOOL-MAP is used to compute the list of tools, "F", for which that user currently has a license.
3. If "F" contains tool "E", go to step 14.
4. For each tool in "F", the TOOL-TO-COMPOSITE-TOOL-MAP is used to determine if the user currently has a license to a composite tool that contains tool "E". If the user has such a license, go to step 14.
5. The TOOL-TO-TOKEN-USE-ALGORITHM-MAP is used to look up the algorithm,"G", to be used to compute the tokens needed for tool "E".
6. The PROJECT-TO-PROPERTY-LIST-MAP is used to look up the current property list, "H" for the project "D".
7. The algorithm "G" is applied to the property list "H" to compute the number of tokens, "I", required for tool "E".
8. For each tool in "F", if the TOOL-TO-COMPOSITE-TOOL-MAP for that tool contains "E", then subtract the token value of that tool from "I" and add the tool to the tool list "J".
9. For each tool in each entry in the USER-TO-TOOL-MAP, if the date for that tool is less than (CURRENT-DATE - DEFAULT-TIMEOUT), then remove that tool from that entry, and add the tokens used by that tool to TOKENS-AVAILABLE.
10. If "I" is greater than TOKENS-AVAILABLE then return a "no licenses available" error response, and exit the algorithm.
11. Subtract "I" from TOKENS-AVAILABLE
12. For each tool in "J", remove the entry for that tool from the USER-TO-TOOL-MAP for user "A".
13. Add an entry for tool "E" in the USER-TO-TOOL-MAP for user "A".
14. Set the date for tool "E" in the USER-TO-TOOL-MAP for user "A" to be the value of CURRENT-DATE.
15. Return a "license granted" successful response, and exit the algorithm.

FIG. 6

TOKEN LICENSING MAPPING COSTS TO ENABLED SOFTWARE TOOL FEATURES

BACKGROUND

The present invention relates to the field of software licensing, and, more particularly, to token based licensing of software tools having token costs that vary based upon a set of features enabled for the software tools.

Many models exist for software licensing. License models include per product license, user based licenses, and concurrent use licenses. One specific license model, referred to as a token license model, utilizes tokens instead of a specific number of licenses that correspond to a discrete software tool. In the token license model, use of a software tool can consume a quantity of tokens from a previously established token pool. Different software tools can be designed to use the token pool, each of which can be associated with a tool specific quantity of tokens. Customers requiring additional usages of token consuming tools can purchase additional quantities of tokens, which are added to the token pool.

Traditional token license models associate a fixed token cost per software tool. In this sense, each software tool is handled by the licensing system implementing token license model as a uniform, discrete entity having a fixed token cost. There is a disconnect from this assumption, however, and real-world realities. This disconnect results in a market bias that disfavors venders of more sophisticated tools.

To elaborate, venders of software tools can choose to implement these tools in a myriad of ways, each of which results in different customer derivable values and each resulting in different vender costs for implementing the software tool. Many design choices that incur significant incremental costs relate to providing advanced features, such as providing capabilities for broad support for a large set of integrated tools, for sophisticated and automated operational guidance, user-directed data customizations, and for high concurrent usages. These advanced features can require substantial implementation complications and overhead, which are not inherent in implementing approximately equivalent software tools that lack the advanced features. Once a software tool has been implemented, it can be impossible or disproportionately costly to upgrade the implemented software tool to include previously lacking advanced features, as these features may require extremely low-level adjustments to a software tool. That is, the adjustments for many advanced features can require structural or fundamental changes, which can require a complete re-write of the software tool.

Traditional market bias disfavoring sophisticated software tools results from cost decisions being driven at a particular point in time, typically during an initial purchase period for a tool. A purchaser of a tool, who does not initially have a need for advanced features or who is unaware of this need, will likely opt for low-cost solution, which lacks these features. As the software tool is utilized, however, and as a purchaser begins to rely upon it, a need for more advanced features can emerge and/or can become more evident. Purchasers are locked into a selected tool for at least a period defined by purchased tokens or other licensing agreements. Further, migration from an original tool lacking advanced features to one including advanced features is often far from seamless and can be costly in terms of data migration, required training, and other such factors. These are costs in addition to the "upgrade cost" or the delta between the cost for the advanced feature enabled software tool and the software tool lacking such a feature.

Additionally, tool providers attempt to establish sets of "advanced features" commensurate with market value/implementation costs. These pre-packaged bundles (such as basic, standard, advanced, enterprise) often do not permit users to select their own desired feature set. That is, a user may desire a given advanced feature present in an enterprise bundle, yet not desire other features of that bundle, where the strength of feature desire is insufficient to justify the incremental cost incurred between the advanced and enterprise bundle. Thus, a rigid scheme of pre-packaging feature sets for set-defined costs does not provide an optimal market return on a per-feature basis.

SUMMARY

A token license model where token costs required for a software tool use varies based upon features enabled for the software tool. A set of enabled features can be customized by a token purchaser, such as a company's IT administrator. In one embodiment, users can be permitted to establish different sets of enabled features (and therefore different costs) for different projects. Adjustments to sets of enabled features (otherwise referred to as activated features) can be performed after an initial token pool has been purchased. Thus, a token purchaser need not make long-term feature versus cost decisions at an initial time of purchase, but can make necessary adjustments as a set of token consuming software tools are utilized.

One aspect of the disclosure is for a system using tokens to license computer program products. The system can include computer program products, a data store, and a token cost calculator. Each computer program product can have a set of selectively activate-able features. The data store can include indexed records relating different user-sets to specific ones of the computer program products and to user-set specific feature-sets. Each feature-set can define which of the selectively activate-able features of the related computer program product are activated when provided to the related user-set. The token cost calculator can determine a token cost for users of the different user-sets to utilize each of the computer program products with each of the feature-sets activated. Different token costs can be determined by the token cost calculator for use of the same computer program product depending upon which feature-set is activated when the computer program product is utilized.

Another aspect of the disclosure can include a method and a computer program product for incurring varying token costs for activating software tools depending upon enabled feature-sets. A request to activate a software tool can be received, where activation requires a quantity of tokens of a token license model. An entity, project, user-set, user, or combination thereof corresponding to the request can be ascertained. A feature-set to be enabled can be determined by querying preexisting indexed records. The preexisting indexed records can associate different feature-sets to different entities, projects, user-sets, users, or combinations thereof A token cost can be computed for activating the software tool with the feature-set enabled for the request. Token costs for utilizing the software tool can vary depending upon the enabled feature-set. The computed token cost can be the quantity of tokens required to activate the software tool responsive to the request.

Still another aspect of the disclosure can include a user interface for configuring feature-sets of a software tool having variable token cost per feature-set. The user interface can include a user-set selection element, feature configuration elements, token cost presentation elements, and an apply element. The user-set selection element can be a project selection element or a user selection element. The user-set selection element can determine a group of one or more users for whom settings established through the user interface applies. Each feature configuration element can have a user configurable parameter corresponding to a specific one of the features. Each token cost presentation element can correspond to one of the feature configuration elements. Each of the token cost presentation elements can present a cost in tokens incurred for the corresponding feature assuming the user configurable parameter is established for the corresponding feature. The apply element can be a user selectable interface element to accept the features with the values presented in the feature configuration elements for the software tool.

BRIEF DESCRIPTION OF THE DRAWINGS

There are shown in the drawings, embodiments which are presently preferred, it being understood, however, that the invention is not limited to the precise arrangements and instrumentalities shown.

FIG. 1 shows a set of scenarios for token based licensing where token cost varies by enabled software tool features in accordance with embodiments of the inventive arrangements disclosure herein.

FIG. 6 shows a sample algorithm for charging a variable token amount for use of software tools that is dependent upon an enabled feature set in accordance with an embodiment of the inventive arrangements presented herein.

DETAILED DESCRIPTION

Figure 2:
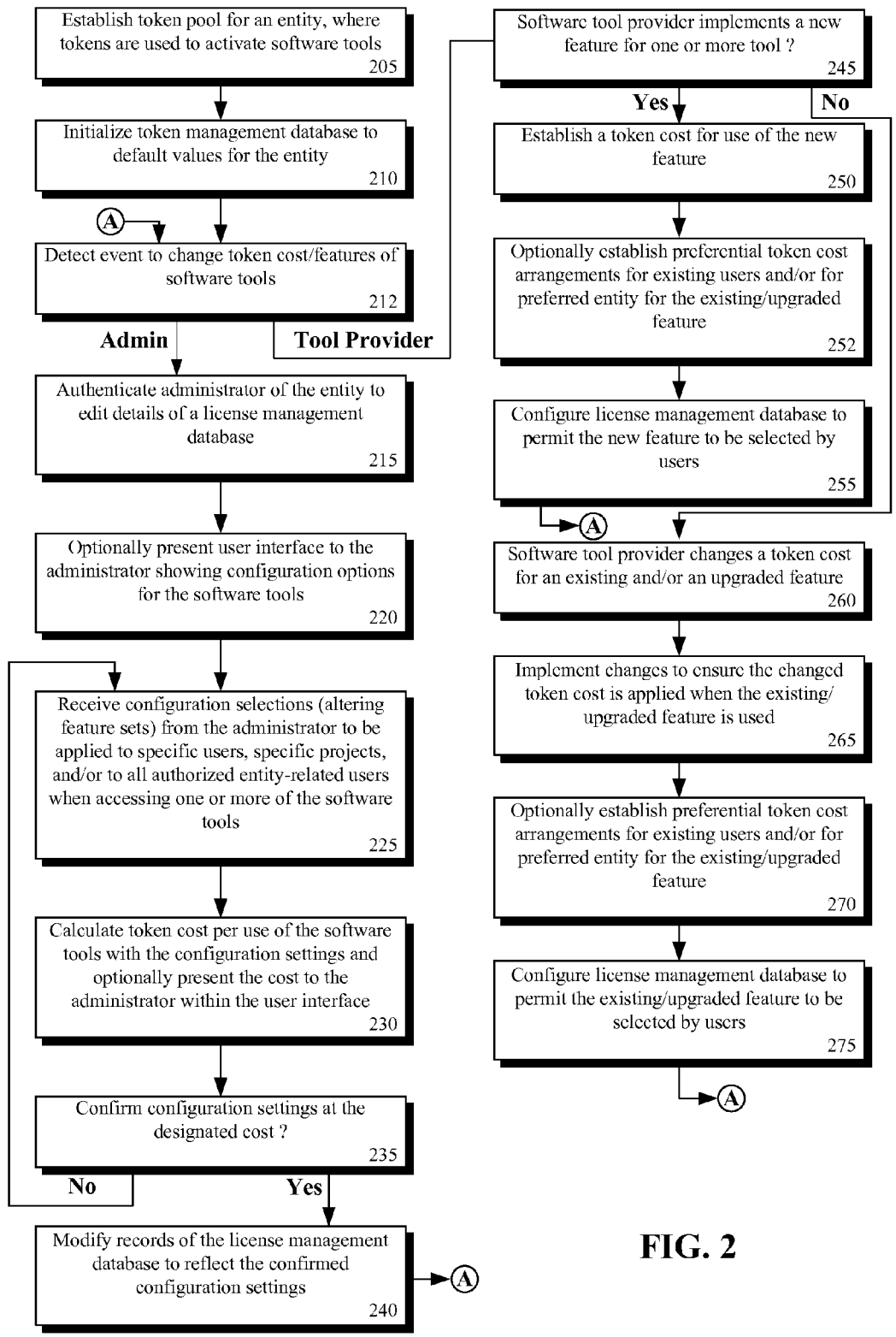
FIG. 2 is a flow chart of a method for establishing variable token costs for software tools depending upon enabled feature sets in accordance with an embodiment of the inventive arrangements disclosed herein.

The disclosure includes tokens for software tool use, where token cost for software tool use varies based upon enabled features of the software tool. A token owner can configure which of a set of available (e.g., selectively activate-able) features is to be enabled or activated. In one embodiment, different sets of features can be established for different projects and/or sets of users. Software features of a software tool can be altered after a pool of tokens has been purchased, which permits greater flexibility than is currently possible in a post-token purchase stage when conventional token license model techniques are utilized. That is, token purchasers can adjust a set of enabled (also referred to as activated) features of a software tool as desired. This permits purchasers to alter software tool features to suit their business needs, which are subject to change. An ability to alter the feature set enabled for a software tool, which alters token cost, also reverses a market bias against sophisticated software tools and instead creates a market bias favoring sophisticated software tools compared to less sophisticated tools. That is, for comparable market prices, a purchaser is expected to opt for sophisticated software tools since advanced features can be selectively enabled for an increased costs at any time, which is an option lacking in less sophisticated software tool implementations that fail to include advanced features in their design.

The present invention may be embodied as a method, system, or computer program product. Accordingly, the present invention may take the form of an entirely hardware embodiment, an entirely software embodiment (including firmware, resident software, micro-code, etc., where the software is stored on a storage medium) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction interpretation system. For the purposes of this description, a computer-usable or computer readable storage medium can be any apparatus that can contain, store, communicate, propagate, or transport the program for use by or in connection with the instruction interpretation system, apparatus, or device.

Any suitable computer usable or computer readable storage medium may be utilized. The computer-usable or computer-readable storage medium may be, for example but not limited to, an electronic, magnetic, optical, electromagnetic, infrared, or semiconductor system, apparatus, or device. Examples of a computer-readable storage medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual running of the program code, bulk storage, and cache memories which provide temporary storage of at least some program code in order to reduce the number of times code must be retrieved from bulk storage when the code is run.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 shows a set of scenarios 120, 130, 140, 150, and 160 for token based licensing where token cost varies by enabled software tool features in accordance with embodiments of the inventive arrangements disclosure herein.

Each scenario 120, 130, 140, 150, and 160 shows a token consumer 108, which includes a computing device 102 presenting a software tool 106 to a user 104. Use of the software tool 106 can consume a quantity of tokens 118. Token 118 cost can vary based on an enabled(e.g., activated) feature set of the software tool 106, which is determined by the license manager 110 responsive to a request 117. The license manager 110 can include one or more license servers 116, each of which accesses a data store 114 that handles a pool of tokens 112 available to the token consumer 108.

It should be understood that scenarios 120, 130, 140, 150, and 160 are expressed in FIG. 1 in simplistic terms for ease of expression. In actual implementations, a computing device 102 of a consumer 108 may host software/firmware that is only activated and executable upon hardware of device 102 when a required number of tokens 118 are available. Alternatively, the software tools 106 can be hosted on a Web server or other network element connected to device 102 a network, which provides content to computer 102, such as within a browser. In such a case, the Web server or network element may be the component, which actually requires and consumes the tokens 118. Similarly, functionality of the license manager 110 can reside in a computing device or within any set of communicatively linked computing devices. In one embodiment, for example, computing device 102 and server 116 can be implemented within a single physical device. In another embodiment, server 116 and/or device 102 can be implemented as a distributed set of a plurality of different machines, which function as a single distributed computing device. Further, the license pool 112 can be centrally managed or spread across multiple computing devices. In one embodiment, tokens 118 can be set to expire in a relatively short span after a discrete use to reappear in the pool 112 upon expiration. In another embodiment, tokens 118 can be assigned for a longer duration by default, such as until a usage license for that token expires. Thus, each token 118 can be removed from the pool 112 until or unless the token 118 is explicitly returned to the pool 112.

Exchanges of data (e.g., requests 117, tokens 118, etc.) between token consumer 108 and license manager 110 can occur over a network (network 570, for example) or over any transport medium in which carrier waves can transport digitally encoded data between two communicatively linked entities (e.g., consumer 108 and manager 110). Further, data can be exchanged between consumer 108 and manager 110 via a storage medium, which can be a transport medium able to be physically connected/disconnected to device 102 and device 116 (or to a storage medium/computing component, which each device 102, 116 is able to access).

As used herein, a software tool 106 is a computer program product formed from a set of computer programmatic instructions executable on a processor, where the computer program product can be digitally stored on a storage medium. The software tool 106 can include software and firmware. Use of each of the software tools 106 can consume tokens 118 of a token license model. Software tools 120 can include any executable application, routine, or other set of token-controllable computer program instructions. Applications can include business software, utility and operating system software, media processing software, database software, gaming software, networking software, software services, and the like. Each software tool 120 can have one or more selectively activate-able features, which are able to be enabled (activated) or placed in a non-enabled state (deactivated). Features can be optionally grouped together, where different sets of features or discrete features can be associated with different token costs.

In one embodiment, a software tool 106 can be more narrowly defined to refer to a specific type of computer program product that is used by a member of a software development team to automate some aspect of the software development process. Some examples of this type of software tool 106 includes editors, compilers, debuggers, requirements management tools, testing tools, change management tools, and software configuration tools.

A token 118 can be an object of a token license model that controls use of a computer program product. A token 118 can comprise digitally encoded information, which is storable in a storage medium and is conveyable over a transport medium, such as a carrier wave. A token 118 can be fixed or floating and can remain viable for a perpetual-term or for a fixed-term. In one embodiment, a token 118 can be a consumptive token, which is consumed upon use (e.g., effectively a token-term where the fixed-term is for a single use).

A floating token is one used in a floating license model, where each time a particular software tool 106 is run, it checks out a token from the pool 112 for the duration of the operation. After the duration of the operation, the checked-out token is returned to the pool 112. Floating tokens can be alternatively referred to as concurrent tokens (e.g., conforming to a token-based concurrent licensing model) or network tokens (e.g., conforming to a token-based network licensing model).

A fixed token can be one that is assigned to a particular user or device, which is not automatically returned to the token pool 112 upon use. A specific user or reclamation action can be required to return a fixed token to the token pool 112.

A perpetual-term token is valid for a perpetual duration. Hence a perpetual-term token does not self-expire or expire after a fixed duration. Use of a perpetual-term token can be limited, such as being limited for use on specific versions of a software tool 106. Thus, after a major upgrade of a software tool 106, a new type of perpetual-term token may be required, where the old type of perpetual-term token may still be utilized for using the non-upgraded version of the tool 106. In one embodiment an exchange rate (or trade-in rate) can be established for converting an old token type to a new token type. Additionally, a cost in tokens (for perpetual-term or for fixed-term tokens) for use of a tool 106 is not necessarily fixed in time. That is, different token costs can be incurred for different usages of a tool 106 over time, even when perpetual-term tokens are utilized. Thus, there is no guarantee that the "value" of a perpetual-term (or fixed-term) token will remain constant over time.

A fixed-term token is a token 118 that is intended to expire. The expiration of a fixed-term token can be based upon a time period, a quantity of usages, or upon any other definable condition.

In scenario 120, the token consumer 108 (including User U1 as a user 104) can request 117 access to Tool A. License manager 110 can process the request 117, and determine from previously stored records and/or from information digitally encoded in the request 117 that the request 117 is associated with User U1, who is associated with Feature Set 1, which has an associated cost of ten tokens. The ten tokens 118 can be extracted from the token pool 112 available to the user 104 and can be sent to activate the requested software tool 106.

Scenario 130 is similar to scenario 120. In scenario 130, a different user 104 (User U2) issues the request 117 to access Tool A to the license manager 110. Feature Set 2 is associated with User U2 and Tool A, where Feature Set 2 has an associated cost of twelve tokens. The twelve tokens 118 can be extracted from the token pool 112 available to the User U2 and can be used to activate the requested software Tool A, enabled for Feature Set 2.

In scenario 140, a requesting user 104 can be associated with a defined project, Project 1. As used herein, a project identifies a set of persistent data objects being maintained by a server and a set of users who are given access to those objects. Projects are often focused around a cohesive business goal. When the Project 1 user issues a request 117 for Software Tool B, established Feature Set 1 can be enabled. License manager 110 can establish a token cost of twenty tokens for use of Tool B enabled for Feature Set 1. This token cost can be extracted from the token pool 112 available to a user 104 associated with Project 1, which permits use of Tool B enabled for Feature Set 1.

Scenario 150 is similar to scenario 140. In scenario 150, user 104 is associated with Project 2. The license manager 110 can determine that a use of Software Tool B, for Project 2 is configured to enable Feature Set 2, which has an associated cost of sixteen tokens. This amount can be extracted from a token pool 112 available to a user of Project 2 to permit user 104 associated with Project 2 to use Tool B enabled for Feature Set 2.

One example of a more complex scheme involving token costs for software tool use is shown in scenario 160. The disclosure is not to be construed as being limited by this example. Indeed, configuration of software tools based on a token license model can occur at a variety of levels of granularity and with any desired level of complexity. In scenario 160, a set of software tools, such as a set including Tool M and Tool N, can require use of one or more sub-computer program products, referred generically herein as routines. It is further possible for different feature sets for the software tools to utilize different routines. Each of these routines can also be associated with different feature sets (not shown in scenario 160) which can be configurable and can have variable associated token costs. Stated differently, routines can be software tools as used and defined herein.

As shown in scenario 160, Tool M enabled for Feature Set 1 requires a use of Routine A, Routine B, and Routine C. Tool N enabled for Feature Set 1 requires a use of Routine B, Routine D, and Routine E. Multiple software tool, such as Tool M and Tool N can be concurrently utilized by a single token consumer 108. A concurrent use may only require a single use or instantiation of a routine. Thus, concurrent use of Tool M and Tool N, each enabled for Feature Set 1, can require use of Routine A (four token cost), Routine B (three token cost), Routine C (three token cost), Routine D (two token cost), and Routine E (five token cost), a sum of which has a cost of eighteen tokens. This is true even though a discrete use of Tool M enabled for Feature Set 1 can cost ten tokens and a discrete use of Tool N enabled for Feature Set 1 can cost ten tokens.

FIG. 2 is a flow chart of a method 200 for establishing variable token costs for software tools depending upon enabled feature sets in accordance with an embodiment of the inventive arrangements disclosed herein.

The method 200 can begin in step 205, where a token pool can be established for an entity, which can be a business, an organization, an individual, and the like. These tokens can be tokens of a token license model that can be used to activate software tools. In step 210, a token management database can be initialized for default values for the entity.

In step 212 an event that changes token cost and/or features of a set of one or more software tools can be detected. This event can be either an administrative event taken by an administrator of the entity or can be a tool provider event, which changes an aspect of the software tools, which the tokens of the token pool activate.

For administrative events, an authorized administrator of the entity can provide authentication information, such as user name and password, which permit the administrator to edit details of the license management database, as shown by step 215. In step 220, the administrator can be optionally presented with a user interface (e.g., a graphical user interface or a Web interface, for example) showing a set of confirmation options for the software tools available to the entity. Alternatively, messages of any form (digital, postal, voice, etc.) can be used to edit details of the license management database. For example, administrators can communicate directly with database administrators, who effectuate database changes.

In step 225, configuration settings, which can alter feature sets enabled for a given software tool and user set, can be received. These configuration settings can apply to different sets of people, such as applying to specific users, specific projects, and/or all authorized users associated with a given entity. The configuration settings are used to determine what features are to be enabled for a given tool, when accessed. In step 230, a token cost can be calculated per use of the software tools. This token cost can vary depending on which features are enabled. The token cost can optionally be presented to the administrator within a user interface, should one be utilized. In step 235, a confirmation can be required before the configuration settings received at step 225 are applied to the database. If confirmation is not given, then previous configuration settings can be maintained in the database until additional configuration settings are received, as expressed by step 235 proceeding back to step 225. If confirmation is provided, records of the license management database can be modified to reflect the confirmed configuration settings, as shown by step 240. The method can proceed from step 240 to step 212, where other events affecting the software tools can be detected.

When a tool provider event, which changes an aspect of a feature or token cost for a software tool, is detected in step 212 the method can progress to step 245. The tool provider event can signify a new feature, in which case the method progresses to step 250, or can signify an change to an existing feature or feature cost, in which case the method progresses from step 245 to step 260.

In step 250, a token cost can be established for a new feature. This token cost can optionally vary from entity to entity, as shown by step 252. For example, a preferential token cost can be applied to preferred entities. In step 255, records of the license management database can be updated to permit the new feature to be selected by users for the established token price. This price may be fixed or may vary in accordance with a value of an adjustable parameter. Once database changes have been made for the new feature, the method can proceed to step 212 where additional administrator and tool provider events can be detected and handled.

In step 260, the software tool provider can change a token cost for an existing feature. This change in cost can, but need not, result from a feature upgrade. In step 265, changes to the software tool, if any, can be implemented. This ensures that the newly determined software cost is assessed to the correct feature version. In step 270, preferential token cost arrangements can be optionally established. For example, when an existing feature is upgraded, preferential pricing (token cost) can be established for users who previously utilized that feature. For instance, an upgraded feature may cost an additional token, which existing users (ones having the non-upgraded version of the feature enabled) do not incur. Some entities may also receive preferential treatment over other entities. In step 275, records of the license management database can be adjusted to reflect the changes. Once database changes have been made for the new feature, the method can proceed to step 212 where additional administrator and tool provider events can be detected and handled.

Figure 3:
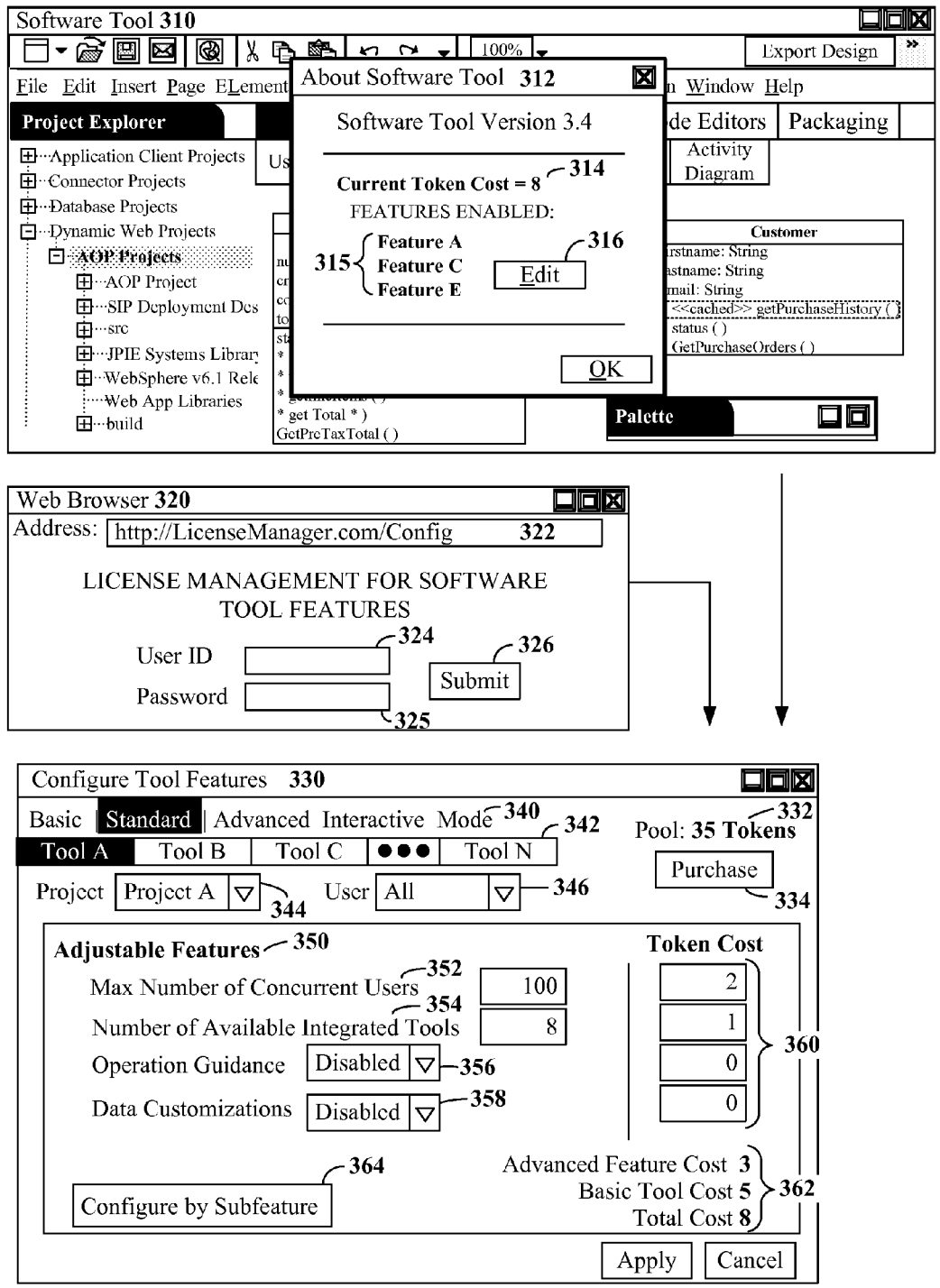
FIG. 3 shows a sample set of user interfaces for displaying and/or configuring software tools with selectively enabled features in accordance with an embodiment of the inventive arrangements disclosed herein.

FIG. 3 shows a sample set of user interfaces 310, 320, 330 for displaying and/or configuring software tools with selectively enabled features for varying token costs in accordance with an embodiment of the inventive arrangements disclosed herein. Each interface 310, 320, 330 is for illustrative purposes only, and the disclosure is not to be construed as being limited to specific arrangements and elements shown.

Interface 310 shows a software tool having a popup 312 or other viewable option for presenting information showing an enabled feature set 315 and a tool token cost 314. It should be assumed that token cost 314 varies based upon the enabled feature set 315. A selector, such as button 316, can be included, which permits the enabled features and associated token cost to be edited. Selection of button 316 can result in a presentation of interface 330. It should be emphasized that no known software tool displays an associated token cost 314 or enables features sets 315 with variable token costs to be edited 316 from the tool itself.

Interface 320 shows a Web browser interface, where a user can specify a URL 322, authenticate themselves (by providing a user id 324 and password 325, for example), and opt (by selecting button 326, for example) to proceed to a configuration screen, such as interface 330. Thus, user interface 330 for configuring features of software tools can be reached from the tool itself (interface 310) or directly (interface 320), such as through a Web interface. In one embodiment the logging functions (elements 324, 325, for example) of interface 320 can be incorporated directly into interface 330.

Interface 330 shows a number of options for configuring features of a software tool. In interface 330, a quantity of tokens 332 available in a pool can be displayed along with an option 334 to purchase additional tokens. Additional interface elements (not shown) relating to the token pool can also exist, such as an option to see a number of total tokens purchased, option to see a number of tokens in use, an option to recapture tokens in-use to increase the tokens in the pool, and the like.

Interface can have multiple interactive modes 340, such as a basic mode, a standard mode, and an advanced mode. The basic mode can group features together, such as providing options for selecting a "basic" feature set, a standard features set, a business feature set, and an enterprise feature set. The standard mode can provide an ability to change individual features of a software tool to suit an administrator's needs. The advanced mode can provide finer grain control of options, such as permitting configuration of features down to a sub feature level.

Interface element 342 can permit a user to select one or more software tools, which are to be modified. Modifications can be applied by project selectable through element 344 and/or by user through element 346. A single user 336 can be associated with multiple projects 344, in which case project specific settings will be applied. In such a case, the login information (such as that shown in interface 320) will include an element to specify the project for which a tool is being utilized.

An interface section to adjust features 350 can include any of a variety of features. Features 350 can have configurable parameters, such as being able to specify an integer for a maximum number of concurrent users 352 and being able to specify an integer for a number of available integrated tools 354. Other features 350 can be enabled or not, such as operation guidance 356 and data customizations 358. A token cost 360 can be optionally shown for each configured feature 352-358. Further, a total cost 362 can be presented in interface 330 for utilizing the software tool. In one embodiment, an option to configure by sub-feature 364 can be presented. Additionally, options to configure subtools (referred to as routines in scenario 160) of a given tool 342 can be provided.

Figure 4:
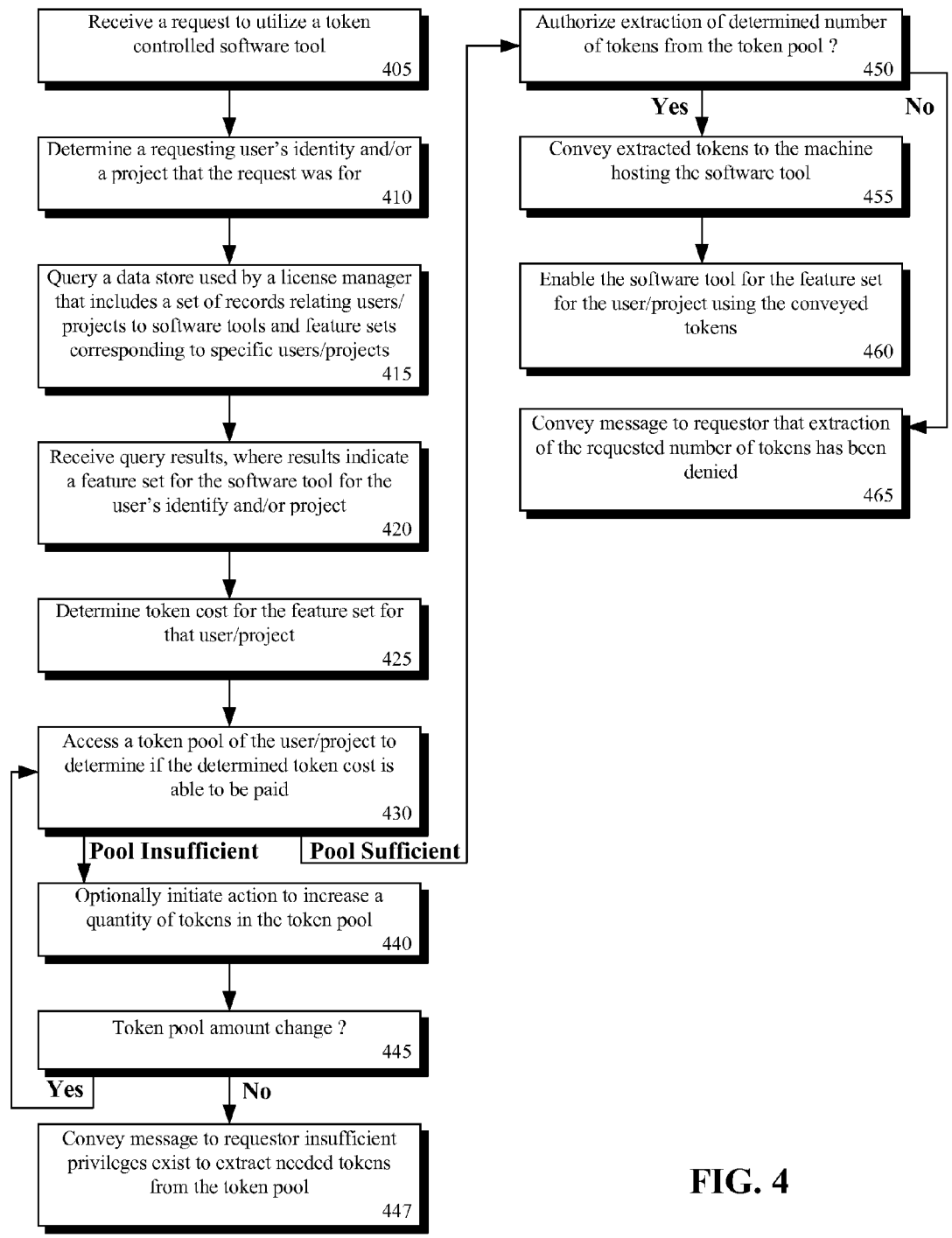
FIG. 4 is a method for activating software tools having variable features and variable token costs based upon the enabled feature sets in accordance with an embodiment of the inventive arrangements disclosed herein.

FIG. 4 is a method 400 for activating software tools having variable features and variable token consumption charges based upon the enabled feature sets in accordance with an embodiment of the inventive arrangements disclosed herein. Method 400 assumes a pre-configuration of records of a license management server has occurred. For example, method 200 can occur before method 400 is initiated.

In step 405, a request to utilize a token controlled software tool can be received. In one configuration, the request can originate from a client, can be digitally conveyed over a network within a carrier wave, and can be received by a license management server. In step 410, a requesting user's identity and/or a project the requesting user is associated with can be determined. In one embodiment, the request can include this data. In another embodiment, a unique identifier, such as a machine address (URL, MAC address, etc.), can be determined for the request, which can be used to look-up the user's identity and/or associated project.

In step 415, a data store used by the license manager can be queried. This data store can include a set of records that relate users and/or projects to software tools and feature sets. In other words, feature sets enabled for a software tool can vary for different users and/or projects, where data store records chronicle these relationships. Results can be generated from the query, as shown in step 420. The results can indicate a feature set that is to be enabled when the requester utilizes the software tool.

In step 425, a token cost can be determined for software tool usage with the enabled feature set. In one embodiment, a formula can be established for computing the cost, where feature specific parameters are the variables of the formula. In another embodiment, the token cost can be recorded in a database, where different features have different cost adjustments to a baseline cost. Additionally, embodiments are contemplated where different projects, users, and/or entities are charged different amounts for use of the same tool with the same features enabled. In other words, customer specific token cost structures can be implemented. Further, combinative feature cost discounts can be supported, where groups of features can be enabled for a lesser token cost that a sum of token costs for enabling each discrete feature of the group.

In step 430, a token pool associated with the requestor and/or the requestor's project can be accessed to ascertain whether the determined token cost is able to be paid. It should be noted that even when a token pool is associated with an entity, a quantity of tokens available to each project and/or user associated with the entity may be constrained. For example, a company can have a token pool of three hundred tokens, but a given project may be constrained to using at most forty tokens. Similarly, user specific token quantity limitations can be established.

When the pool contains an insufficient amount of tokens, an action to increase the quantity of tokens in the pool can be taken, as shown by step 440. For example, additional tokens can be purchased, assigned tokens can be recovered and placed back into the pool, constraint limitations for a specific requestor can be increased, and the like. If the token pool amount (effective amount for this requestor) is changed, the method can proceed from step 445 to step 430, where another evaluation of request cost versus pool-available tokens can occur. Otherwise, a message can be optionally conveyed to the requestor that indicates insufficient tokens are available to enable the software tool for the requested features, as indicated by step 447. The requestor can wait for additional tokens to become available, can initiate manual actions to increase his/her token quantity, or can adjust features to be enabled downward, which can decrease utilization cost to a quantity of available tokens.

When the quantity of tokens in the pool is sufficient, the method can proceed from step 430 to step 450. In step 450, an extraction of the determined number of tokens from the token pool may require additional authorization. In such a situation and when authorization fails, a message can be conveyed to the requestor, that indicates a denial of the requested number of tokens. Assuming authorization is successful, the appropriate number of tokens can be extracted from the pool and conveyed to the machine hosting the software tool, as shown in step 455. In step 460, the software tool can be enabled for the feature set, which consumes the quantity of tokens.

Figure 5:
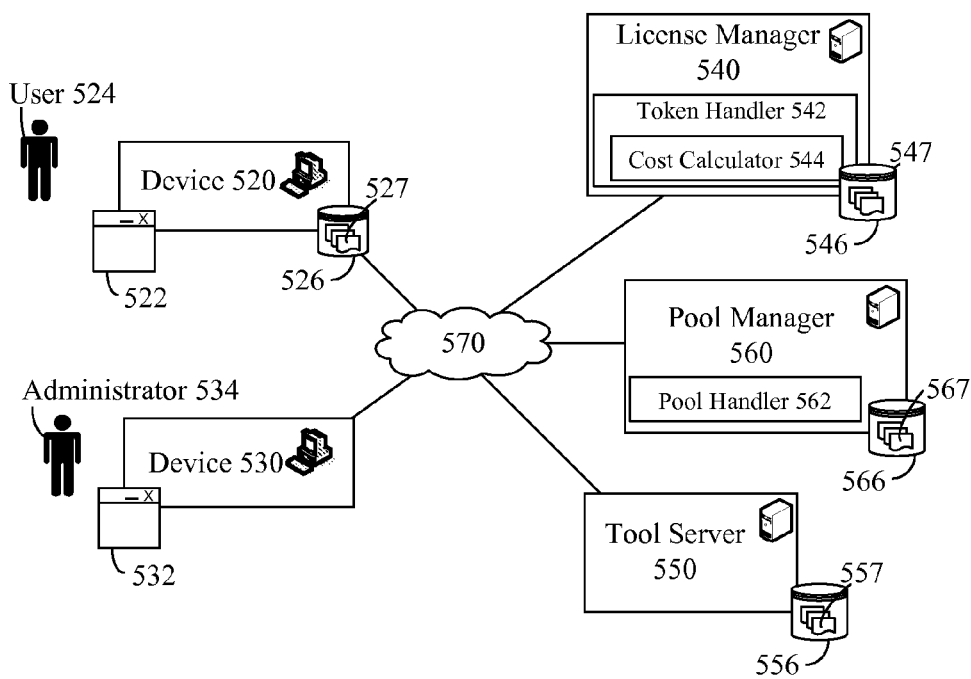
FIG. 5 is a schematic diagram of a system for software tools having variable token costs depending on enabled feature sets in accordance with an embodiment of the inventive arrangements disclosed herein.

FIG. 5 is a schematic diagram of a system 500 for software tools having variable token costs depending on enabled feature sets in accordance with an embodiment of the inventive arrangements disclosed herein. In system 500, a set of devices 520, 530 can be communicatively linked to servers 540, 550, 560 via network 570.

A user 524 can utilize a user interface 522 to interact with a software tool. The tool can be hosted locally by device 520, such as being stored in data store 526 as an executable 527. The software tool can also be hosted remotely and served over network 560. For example, tool server 550 can execute one or more software tools 557, which are stored in data store 556. Additionally, more than one software tool 527, and/or 557 can concurrently execute when a user 524 is interacting through interface 522. Use of each software tool 527, 557 can consume a quantity of available tokens 567 of a token pool.

The pool manager 560, which can execute a pool handler 562 computer program product 512, can manage specifics of a token pool. The token pool can be owned by a user 524, a project, or an entity. Manager 560 can handle pools for one or more different users/projects/entities. The tokens 567 of manager 560 can be self-expiring after a duration or can be more permanent. In one embodiment, pool manager 560 can permit expended tokens 567 to be recovered back to the pool and can permit additional tokens 567 to be purchased and added to the pool. User 524, project, and/or entity specific constraints can be implemented by the pool manager 560.

The license manager 540 can determine a license cost incurred by user 524 for using a software tool 527 or 557 with a specific feature set enabled. User 524, project, and/or entity specific feature sets, which are to be enabled can be stored in records 547 of the license manager data store 546. Enablement of different features for a software tool can have varying tool costs. In one embodiment, a subset of tool features can be available on demand, so that the token cost is only incurred upon feature usage. In another embodiment, a set of features can be difficult to enable and will remain associated with software tool use in its configured state for each use. In one embodiment, an administrator 534 can determine whether a user 524 is authorized to modify a feature set enabled for a software tool. In one embodiment, a cost (in either tokens or dollars) can be incurred each time a feature set change occurs. This cost can be implemented to discourage administrators 534 and users 524 from modifying features that are enabled for a tool too often.

The license manager 540 includes a token handler 542, which is a computer program product 512 executable upon the hardware 502 of the manager 540. The token handler 542 can implement the logic needed to configure records 547 that associate users 524 with tool configurations (feature sets). In one embodiment, token handler 542 can enable feature sets to be defined on multiple levels, such as an entity-level, a project-level, and a user-level. By default, the more specific (lower-level) feature set will be the one that is utilized with the software tool. For example, a feature set defined for a person can override a more generic features set established for an entity (i.e., the entity feature set is effectively a default feature set able to be overridden by a more specific one). Additionally, constraints can be established at higher levels (e.g., the entity-level), which are intended to constrain the options available at lower levels. For example, a maximum quantity of tokens can be established at the entity-level, which constrains a number of features (by cost) that are able to be enabled at a user-level.

One component of the token handler 542 can be a cost calculator 544, which is another computer program product 512. The cost calculator 544 can be implemented as a formula with variables for different feature options, which change the overall token cost for the feature. The following is an example of one formula, which could be used by the cost calculator 544 (assumes an embodiment having the features 350 shown in FIG. 3):

> 100 base software tool use cost +(10*max-users/100) +(20*number-available-tools/2) +100 (if operation guidance is provided for that tool) +50 (if data can be customized for that tool)

Using the above, a utilization of a software tool with 100 maximum users, eight available tools, without operational guidance, and with data customizations enabled would result in a token cost of:

> 100+(10*100/100)+(20*8/2)+0+50=100+10+80+ 50=240 tokens.

An alternative formula that increases more rapidly when multiple features are combined can be the following:

> 100 base software tool use cost +(10*max-users/100) +(20*number-available-tools/2) *1.5 (if operation guidance is provided for that tool) *1.75 (if data can be customized for that tool)

Using the alternative formula, the cost for a utilization given the above conditions (100 maximum users; 8 available tools; no operational guidance, data customizations enabled) would result in a token cost of:

> 100+(10*100/100)+(20*8/2)*1*1.75
> 100+10+87.5=197.5 tokens.

It should be appreciated that the above two formulas are presented to show that different computations can be performed by the cost calculator 544 and that the exact formula and computational logic used will vary from implementation to implementation. Regardless of implementation specifics, the cost calculator 544 calculates different costs in tokens for use of a software tool depending upon which features are enabled.

In one embodiment, an administrator 536 (who can be a user 524 or a different human managing system 500 details for a set of one or more users 524) can edit specifics of the license manager 540, the pool manager 560, and/or the tool server 550 via user interface 532. For example, administrator 526 can configure user specific limitations and constraints of pool manager 560, which affects a quantity of tokens 567 available to user 524. In another example, administrator 534 can modify settings and/or records of license manager 540 to change which features are activated for a software tool when accessed by user 524. Administrator 534 can also modify tool server 550 specifics, such as upgrading a software tool feature or implementing a new software tool feature.

Each of the devices 520, 530 and servers 540, 550, 560 can be implemented as single devices, virtual devices, or as a set of devices (proximately located to each other or distributed across a geographic space). Additionally, the devices 520, 530 and servers 540, 550, 560 can each include a combination of hardware 502 and computer program products 512, which include software and firmware hosted on the hardware 502. The hardware 502 can include a processor 504, non-volatile memory 505, and volatile memory 506 connected to each other via a communication bus 507. The computer program products 515 can be digitally encoded on a storage medium, such as memory 505 or 506. The computer program products 512 can include an operating system 514 and one or more applications 515 that execute upon the operating system 514. The applications 515 can include software tools as well as computer program products 512 that include one or more software tools.

Each of the user interfaces 522, 532 can be implemented in various forms depending on configuration choices made for system 500. For example, user interfaces 522,532 can be implemented as a graphical user interface, a touch user interface, a voice user interface, a multi-modal user interface, and the like. Additionally, user interfaces 522, 532 can be implemented as interfaces of a stand-alone computer program product 512, as Web interfaces executing within a browser, as rich internet interfaces, and the like.

Network 570 can include any hardware/software/and firmware necessary to convey data encoded within carrier waves. Data can be contained within analog or digital signals and conveyed though data or voice channels. Network 570 can include local components and data pathways necessary for communications to be exchanged among computing device components and between integrated device components and peripheral devices. Network 570 can also include network equipment, such as routers, data lines, hubs, and intermediary servers which together form a data network, such as the Internet. Network 570 can also include circuit-based communication components and mobile communication components, such as telephony switches, modems, cellular communication towers, and the like. Network 570 can include line based and/or wireless communication pathways.

As used herein, each data store 526, 546, 556, and 566 can be a physical or virtual storage space configured to store digital information. Data stores 526, 546, 556, and 566 can be physically implemented within any type of hardware including, but not limited to, a magnetic disk, an optical disk, a semiconductor memory, a digitally encoded plastic memory, a holographic memory, or any other recording medium. Data stores 526, 546, 556, and 566 can be a stand-alone storage unit as well as a storage unit formed from a plurality of physical devices. Additionally, information can be stored within data stores 526, 546, 556, and 566 in a variety of manners. For example, information can be stored within a database structure or can be stored within one or more files of a file storage system, where each file may or may not be indexed for information searching purposes. Further, data stores 526, 546, 556, and/or 566 can utilize one or more encryption mechanisms to protect stored information from unauthorized access.

FIG. 6 shows a sample algorithm 600 for charging a variable token amount for use of software tools that is dependent upon an enabled feature set in accordance with an embodiment of the inventive arrangements presented herein. Specifics of algorithm 600 are for illustrative purposes only and are not to be construed as a limiting the disclosure.

Specifics expressed in algorithm 600 are scenario based. In the scenario, a User A requests an Operation B on Object C. A software tool implementing Operation B determines that a Project D owns Object C. The tool responsively sends the message "request user license for User A, Operation B, Project D to a license server. The license server executes algorithm 600, which is implemented as logic of a computer program product. In one embodiment, logic of algorithm 600 can be implemented within token handler 542 of FIG. 5. Algorithm 600 is provided as an example to clarify one specific manner for implementing logic for the license manager described herein. Different data structures 610 and logical flows (steps 1-15) can be implemented to achieve an equivalent effect to that of algorithm 600, which is not to be construed in a manner that limits the disclosure.

Algorithm 600 utilizes a set of data structures 610, which include structures 612-626 that shall be described in turn. CURRENT-DATE 612 is an integer value that contains the length of time (e.g., seconds) since the license manager was started. DEFAULT-TIMEOUT 614 is an integer value that contains the length of time (using the same units as CUR- RENT-DATE) after which a license is released. TOKENS-AVAILABLE 616 is an integer value that defines how many tokens are still available to be used. OPERATION-TO-TOOL-MAP 618 can be an index (or pointer) to a map that associates with an operation the tool that "owns" that operation. PROJECT-TO-PROPERTY-LIST-MAP 620 is an index to a map that associates with a project a list of named property values. USER-TO-TOOL-MAP 622 is an index to a map that associates with a user the set of tools for which that user currently has a license. The date that the user has last used the tool can be specified for each tool. TOOL-TO-TOKEN-USE-ALGORITHM-MAP 624 is an index to a map that associates with a tool an algorithm that takes as input a list of named property values and produces as output the number of tokens needed to use that tool. The TOOL-TO-COMPOSITE-TOOL-MAP 626 is an index to a map that associates a tool to the set of other tools that logically contain that tool.

In a first step of the algorithm 600, a Tool E owning operation B can be looked up in the OPERATION-TOOL-MAP 626. Next, a list of tools (List F) is provided, where this list can include the set of active tools for which a token cost has already been paid. If the list contains Tool E, the cost has already been paid and the algorithm 600 can skip to step 14. Otherwise, step 4 can execute.

In step 4, the TOOL-COMPOSITE-TOOL-MAP can be referenced for each tool in List F to see if Tool E is a sub-tool of an already active (paid for) tool. If so, no additional license needs to be paid, and the algorithm 600 can skip to step 14. Otherwise step 5 can execute. In step 5, the TOOL-TO-TOKEN-USE-ALGORITHM-MAP can be used to look up Algorithm G that is to be used to compute the quantity of tokens needed for utilizing Tool E.

In step 6, the PROPERTY-TO-PROPERTY-LIST MAP can be used to look up a current property List H for the Project D. Algorithm G can be applied to List H to computer the number of tokens (Number I) required for Tool E. In step 8, the TOOL-TO-COMPOSITE-MAP can be referenced to see if any tool in List F contains Tool E. If so, the token value of that tool can be subtracted from Number I, after which the tool is added to List J.

In step 9, for each tool in the USER-TO-TOOL-MAP, if the date for that tool is less than (CURRENT-DATE minus DEFAULT TIMEOUT), then that tool can be removed from the entry. All tokens used by that tool can be added to TOKENS-AVAILABLE. In other words, the tokens for a deactivated tool (that has timed-out) can be returned to the token pool.

In step 10, if Number I is greater than TOKENS-AVAILABLE, then a "no license available" error can fire, which exits algorithm 600. Thus, if insufficient tokens are present in the token pool for a requested tool, an error occurs.

In step 11, Number I can be subtracted from TOKENS-AVAILABLE (e.g., the token pool). In step 12, for each tool in List J, the entry for that tool can be removed from USER-TO-TOOL-MAP for User A. In step 13, an entry for Tool E can be added to the USER-TO-TOOL-MAP for User A.

In step 14, a date for Tool E can in the USER-TO-TOOL-MAP be set for User A to CURRENT-DATE. In step 15, a license granted response can be returned, which ends algorithm 600.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and run, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof Accordingly, reference should be made to the following claims, rather than to the foregoing specification, as indicating the scope of the invention.

What is claimed is:

1. A system using tokens to license computer program products comprising:
    a processor executing a plurality of computer program products,
    the plurality of computer program products digitally encoded in at least one storage medium, each comprising a plurality of selectively activate-able features;
    a data store comprising records relating different user-sets, specific ones of the computer program products, and feature-sets, to one another, wherein each feature-set defines which of said selectively activate-able features of the related computer program products are activated when provided to the related user-set; and
    a token cost calculator, which is a computer program product digitally encoded in a storage medium, operable to determine a token cost for users of said different user-sets to utilize each of said computer program products with each of said feature-sets activated, wherein the different token costs are determined by the token cost calculator for use of the same computer program product depending upon which feature-set is activated when the computer program product is utilized, and wherein a token cost for concurrent usage of more than one said computer program products by a user-set is based on common features among the computer program products and non common features of the computer program products.

2. The system of claim 1, further comprising:
    a token handler, which is a computer program product digitally encoded in a storage medium, comprising logic needed to configure the indexed records of the data store that associate user-sets with feature-sets; and
    a feature-configuration user interface implemented in a computer program product digitally encoded in a storage medium that is executable by a processor, wherein said feature-configuration user interface presents a set of features enabled for one of said computer program products based upon content of indexed records of said data store, presents a token cost incurred for said set of features, and comprises an editing option to change said set of features, which results in a corresponding change in said token cost.

3. The system of claim 1, further comprising:
    a token manager, which comprises a processor executing a computer program product digitally encoded in a storage medium, operable to receive a request to utilize one of said plurality of computer program products, to determine a user making the request, to determine from indexed records of the data store and from the determined user a user-set, and to determine from the user-set, a feature-set to be activated responsive to the request.

4. The system of claim 1, further comprising:
a token pool of a plurality of tokens purchased by an entity for use of said computer program products, said plurality of tokens being digitally encoded in a storage medium;
a pool handler, which is a computer program product digitally encoded in a storage medium, operable to manage and permit authorized administrators to configure specifics of how tokens of said token pool are able to be utilized by said user-sets, wherein said pool handler imposes a configurable constraint on a maximum-user-set amount of tokens available to at least one of the different user-sets, which said maximum-user-set value is a configurable value less than a quantity of tokens available to the entity.

5. The system of claim 1, wherein at least a portion of the user-sets is a set of one user, wherein said user-set specific features-sets are user specific feature-sets defined for each of said computer program products that a given user is authorized to access, and wherein each computer program product is a software tool.

6. The system of claim 1, wherein each of the computer program products is a software tool, wherein each software tool is a computer program product that consumes a quantity of said tokens when utilized and that automates an aspect of the software development process, wherein said software tool comprises at least two of a code editor, a compiler, a debugger, a testing program, a change management program, and a software configuration program.

7. The system of claim 1, wherein at least a portion of the user-sets is a set of a plurality of users associated with a project, wherein a plurality of persistent data objects associated with the project are stored in a storage medium, said system further comprising:
a token manager, which comprises a processor executing a computer program product digitally encoded in a storage medium, operable to receive a request to utilize one of said plurality of computer program products, wherein said received request specifies one of the persistent data objects associated with the project, to determine the project associated with the requested persistent data object from the indexed records of the data store, to determine a user-set associated with the project, and to determine from the user-set a feature-set to be activated responsive to receipt of the request.

8. The system of claim 1, wherein each selectively activate-able features of the computer program products are features that have an active state and a non-activated state, where placing a selectively activate-able feature in the active state consumes a quantity of tokens.

9. The system of claim 1, wherein an activated state of one of said selectively activate-able features permits a user to access or utilize that feature, and wherein a non activated state of one of said selectively activate-able features is a state where a user is not permitted to access or utilize that feature.

10. A computer program product for incurring varying token costs for activating software tools depending upon enabled feature-sets comprising:
a non-transitory computer readable storage medium having computer usable program code embodied therewith, the computer usable program code comprising:

computer usable program code operable to receive a request to activate a software tool, where activation requires a quantity of tokens of a token license model;
computer usable program code operable to ascertain an entity, project, user-set, user, or combination thereof corresponding to the request;
computer usable program code operable to determine by querying preexisting indexed records, a feature-set to enable for the software tool for the request, wherein said preexisting indexed records associate different feature-sets to different entities, projects, user-sets, users, or combinations thereof;
computer usable program code operable to compute a token cost for activating the software tool with the feature-set enabled for the request, wherein token costs for utilizing the software tool varies depending upon the enabled feature-set, wherein said computed token cost is the quantity of tokens required to activate the software tool responsive to the request; and
computer usable program code operable to display a software tool having a user interface to present an enabled feature-set and a software tool token cost, wherein the user interface further comprising a user interface element to edit the enabled feature-set and associated token cost.

11. The computer program product of claim 10, the computer usable program code comprising:
computer usable program code operable to examine an available quantity of tokens in a previously established token pool; and
computer usable program code configured, when the available quantity of tokens in the token pool exceeds or is equal to the computed token cost,
to remove the computed cost of tokens from the token pool;
to convey the removed tokens to a computing device executing the software tool of the request; and
to activate the software tool utilizing the conveyed tokens;
computer usable program code configured, when the available quantity of tokens in the token pool is less than the computed token cost, to fire a message or an error event that indicates the request is unable to be satisfied due to an insufficient quantity of available tokens being present in the token pool.

12. The computer program product of claim 10, wherein one of the parameters of the request is for a persistent data object, said the computer usable program code comprising:
computer usable program code operable to query a data store of records to determine a project indexed against the persistent data object;
computer usable program code operable to query the preexisting indexed records by the determined project to determine a project specific feature-set, wherein said preexisting indexed records associated a plurality of different feature-sets for the software tool, wherein the different feature-sets are indexed against different projects; and
computer usable program code operable to compute the token cost for activating the software tool with the project specific feature-set.

13. The computer program product of claim 10, wherein said software tool comprises a plurality of sub-tools, wherein activation of each sub-tool requires a quantity of tokens of a token license model, the computer usable program code comprising:

computer usable program code operable to determine that one of said plurality of sub-tools has already been activated by a requisite quantity of tokens computed for said one sub-tool; and computer usable program code operable to discount the token costs for activating the software tool with the feature-set enabled for the request by the cost of said one sub-tool.

14. A computing system for incurring varying token costs for activating software tools depending upon enabled feature-sets comprising:

a computing system comprising a combination of hardware and at least one computer program products, wherein said hardware comprises a storage medium for storing the computer program products and a processor for executing program code of the computer program products, wherein execution of the computer program products causes the computing system to:

receive a request to activate a software tool, where activation requires a quantity of tokens of a token license model;

ascertain an entity, project, user-set, user, or combination thereof corresponding to the request;

determine by querying preexisting indexed records, a feature-set to enable for the software tool for the request, wherein said preexisting indexed records associate different feature-sets to different entities, projects, user-sets, users, or combinations thereof; and compute a token cost for activating the software tool with the feature-set enabled for the request, wherein token costs for utilizing the software tool varies depending upon the enabled feature-set, wherein said computed token cost is the quantity of tokens required to activate the software tool responsive to the request, and wherein a token cost for concurrent usage of more than one said software tools by a user-set is based on common features among the software tools and non common features of the software tools.

15. The computing system of claim 14, wherein each software tool is a computer program product that consumes a quantity of said tokens when utilized and that automates an aspect of the software development process, wherein said software tool comprises at least two of a code editor, a compiler, a debugger, a testing program, a change management program, and a software configuration program.

16. The computing system of claim 14 wherein said software tool comprises a plurality of sub-tools, wherein activation of each sub-tool requires a quantity of tokens of the token license model, wherein execution of the computer program products causes the computing system to:

determine that one of said plurality of sub-tools has already been activated by a requisite quantity of tokens computed for said one sub-tool; and discount the token costs for activating the software tool with the feature-set enabled for the request by the cost of said one sub-tool.

17. The computing system of claim 14 wherein execution of the computer program products causes the computing system to:

group the feature-sets of the software tool into a basic feature set, a standard feature set, a business feature set and an enterprise feature set.

18. The computing system of claim 14 wherein execution of the computer program products causes the computing system to:

establish a formula for computing the token cost, where feature specific parameters are variables of the formula.

19. The computing system of claim 14 wherein execution of the computer program products causes the computing system to:

set the token to expire in a relative short span after a discrete use to reappear in a token pool upon expiration.

20. The computing system of claim 14 wherein execution of the computer program products causes the computing system to:

permit a token consumer to alter the software tool features, which alters the token cost.

* * * * *